April 27, 1965 W. L. GLOMB 3,180,938

REPEATER TERMINAL FOR FREQUENCY DIVISION MULTIPLEX COMMUNICATION SYSTEMS

Filed July 7, 1960

INVENTOR.
WALTER L. GLOMB
BY Alfred C. Hill
AGENT 3,180,938

REPEATER TERMINAL FOR FREQUENCY DIVISION MULTIPLEX COMMUNICATION SYSTEMS

Walter L. Glomb, Clifton, N.J., assignor to International Telephone and Telegraph Corporation, Nutley, N.J., a corporation of Maryland Filed July 7, 1960, Ser. No. 41,403
20 Claims. (Cl. 179—15)

This invention relates to multiplex communication systems and more particularly to a repeater terminal for a frequency division multiplex communication system.

Frequency division multiplex communication systems operable over a long distance and employing one or more repeater terminals have in the past resulted in a prohibitive accumulation of distortion of the transmitted signal due to the repeated demodulation to baseband and remodulation from baseband at the repeater terminals. It was primarily for this reason that intermediate frequency coupled repeater terminals have been resorted to in long-haul, frequency division multiplex communication systems. In this type of repeater terminal, the intermediate frequency signal of the receiver is coupled directly to the intermediate frequency portion of the transmitter without demodulation to baseband and remodulation from baseband. However, when the need arises for extraction or insertion of channel signals at a repeater station it has been common practice to demodulate and remodulate the entire video signal with the attendant distortion. In the demodulation and remodulation process, the principal problem arises from the nonlinearity of the demodulator and modulator. In present practice, the distortion of these components is in the order of 60 db (decibels) as measured by noise loading tests.

Therefore, it is an object of this invention to provide an improved repeater terminal retaining the advantages of an intermediate frequency coupled repeater terminal.

Another object of this invention is to provide an improved repeater terminal having drop-and-insert facilities substantially eliminating distortion of the signal due to the demodulating and remodulating process.

A feature of this invention is the provision of a repeater terminal for a communication system, such as a frequency division multiplex system, transmitting a composite signal including a plurality of distinct frequency segments, such as frequency spaced signal channels, including a receiver for the composite signal, a transmitter for the composite signal and a means responsive to the composite signal at the receiver and the composite signal at the transmitter to cause the composite signal at the transmitter to follow the frequency variations of the composite signal at the receiver.

Another feature of this invention is the provision of a repeater station comprising a phase lock loop including a phase comparator coupled to the intermediate frequency (IF) amplifier of the terminal receiver and the output of the modulator-oscillator of the terminal transmitter to lock the frequency of the output signal of the modulator-oscillator to the frequency of the signal at the output of the IF amplifier. A preselected frequency segment or segments, such as signal channel or channels, are dropped at the terminal by a bandpass filter responsive to the baseband signal at the output of the IF amplifier or at the output of the phase comparator. The segment of the baseband signal dropped at the repeater terminal is rejected in the path from the output of the comparator to the input of the modulator-oscillator by a band reject filter and signals are inserted in a vacant frequency segment or segments of the baseband signal by coupling the signals to the input of the modulator-oscillator.

Still another feature of this invention is the provision of a repeater terminal incorporating the phase lock loop of this invention having a cooperative arrangement with the demodulator portion of the terminal receiver to provide fail-safe features whereby failure of either the demodulator or phase lock loop does not disable the through traffic although there may be an attendant rise in the distortion.

The above-mentioned and other features and objects of this invention will become more apparent by reference to the following description taken in conjunction with the accompanying drawings, in which.

Figures 1, 2, 3:
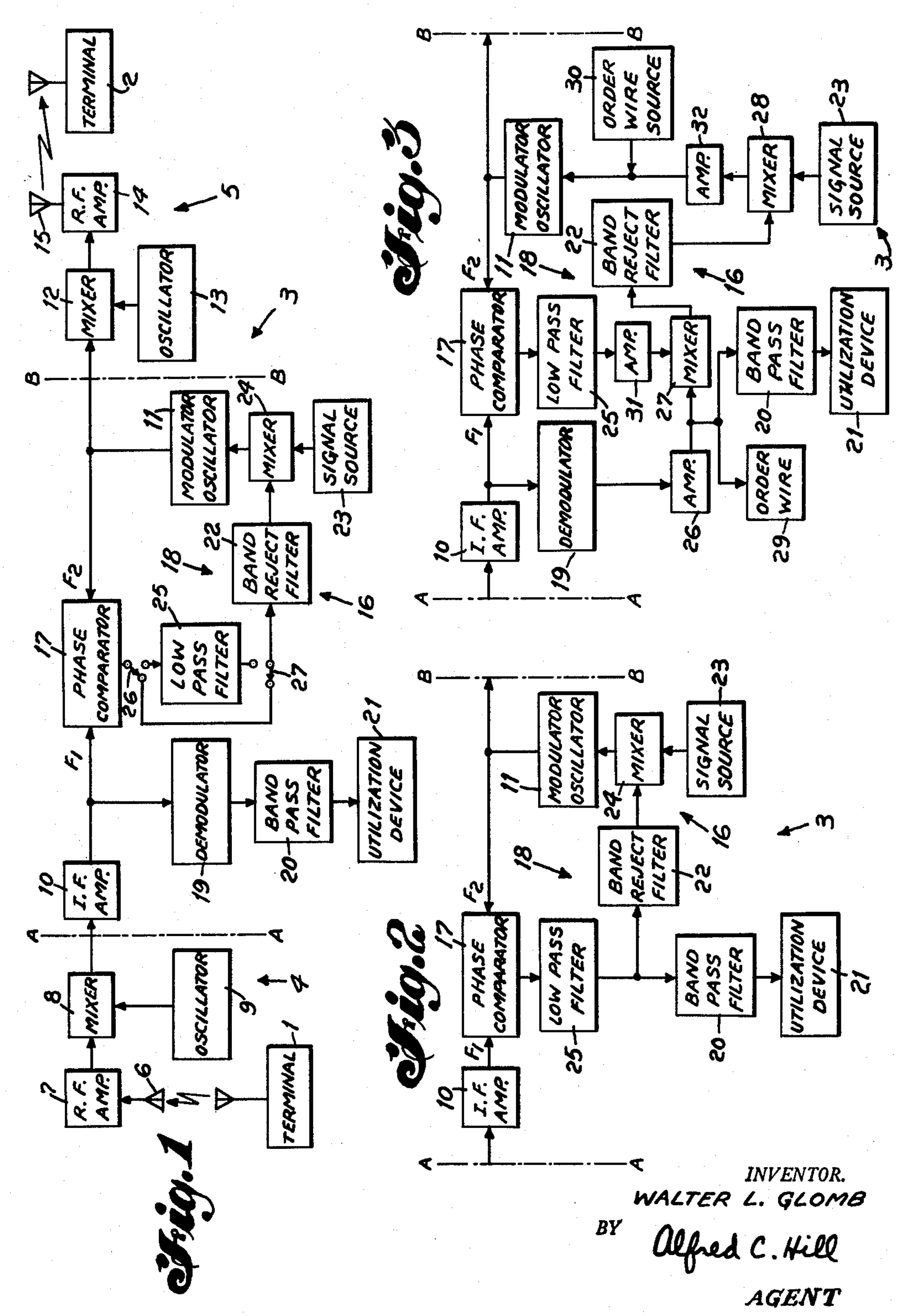
FIG. 1 is a schematic diagram in block form of a communication system employing a multiplex repeater terminal following the principles of this invention.
FIG. 2 is a schematic diagram in block form illustrating an alternative arrangement for the equipment between lines A—A and B—B of the system of FIG. 1.
FIG. 3 is a schematic diagram in block form of another embodiment for the components between lines A—A and B—B of FIG. 1.

Referring to FIG. 1, there is illustrated therein in block diagram form a communication system following the principles of this invention. For purposes of explanation a frequency division multiplex system incorporating the repeater terminal of this invention will be described. The baseband signal is a multiplex signal having the usual character for frequency division multiplex, namely, a plurality of subcarrier signals each separated one from the other with each of the subcarrier signals being frequency modulated by intelligence to be transmitted to thereby provide signal channels. The baseband signal is then operated on to translate the frequency region thereof to the appropriate frequency region for propagation in the communication medium by frequency modulating a radio frequency carrier for instance. For instance, the baseband signal may be provided at terminal 1 for transmission to terminal 2 along a common medium including therein a repeater terminal 3 which in certain instances may be a branch terminal repeater station receiving intelligence signals from a propagation path which makes an angle with the propagation path between terminals 1 and 2. Repeater terminal 3 also may generate signals to enable communication between terminal 3 and terminal 2.

It should be noted that the communication system outlined hereinabove is by way of example only since terminals 1 and 2 could be repeater terminals and include the same components as terminal 3, there could be more repeater terminals between either terminal 1 and terminal 3 or terminal 3 and terminal 2 and for the sake of simplicity the communication system is illustrated as being a one-way communication system. It is obvious that two-way communication may be obtained between terminals 1 and 2 through terminal 3 by providing a second communication path between terminals 2 and 1 via terminal 3 with the appropriate duplication of equipment necessary to carry on this two-way communication. If of course proper consideration is taken the only duplication would be necessary in the equipment between lines A—A and B—B of terminal 3.

Turning now to the description of repeater terminal 3, it will be observed that repeater terminal 3 includes a receiver 4 to receive the multiplex signal from terminal 1 and a transmitter 5 to transmit the multiplex signal from terminal 3 to terminal 2. For sake of illustration, receiver 4 is illustrated as including an antenna 6, a radio frequency amplifier 7 coupled to a heterodyning arrangement including mixer 8 and oscillator 9 to produce an intermediate frequency version of the radio frequency received multiplex signal for application to intermediate frequency amplifier 10. Transmitter 5 is illustrated as including a modulator-oscillator 11, a heterodyning circuit including mixer 12 and oscillator 13 to raise the intermediate frequency output of modulator-oscillator 11 to the radio frequency region for application to radio frequency amplifier 14 and, hence to antenna 15 for propagation to terminal 2.

A means 16 is provided in terminal 3 to be responsive to the multiplex signal at receiver 4 and the multiplex signal at transmitter 5 to cause the multiplex signal at transmitter 5 to follow the frequency variation of the multiplex signal at receiver 4. Means 16 is specifically illustrated to include basically a phase comparator 17 coupled to the output of amplifier 10 and modulator-oscillator 11. Since phase comparator 17 compares a frequency $F_1$ and a frequency $F_2$ where frequency $F_1$ is the frequency at the output of amplifier 10 and frequency $F_2$ is the frequency of the signal at the output of modulator-oscillator 11 and there is a lag between the frequency coincidence of the frequency of these two signals, there will be a difference signal at the output of phase comparator 17. The difference signal will be directly proportional to the received baseband provided modulator-oscillator 11 has a mean frequency equal to the mean frequency of the intermediate frequency signal at the output of amplifier 10. The difference signal at the output of comparator 17 is coupled to modulator-oscillator 11 by a means 18 and modulates the mean frequency thereof to cause the output signal from modulator-oscillator 11 to follow the frequency variation of the signal at the output of amplifier 10, the frequency variation being the baseband frequency modulation.

To provide the drop facilities, one arrangement thereof is illustrated in FIG. 1. The output of amplifier 10 is coupled to a demodulator 19 to recover the baseband, certain channels contained therein being selected by bandpass filter 20 for coupling to utilization device 21. With this arrangement, bandpass filter 20 can have the appropriate bandpass characteristic to pass the signal of a selected channel or the signal of a selected group of channels and utilization device 21 can be a speaker or other device at the repeater terminal 3 itself or may be the appropriate modulation point for propagation from terminal 3 to a branch propagation medium and branch terminal (not illustrated). Since the signal of the channels selected by bandpass filter 20 are for terminal 3, or a further branch terminal displaced from terminal 3, the selected dropped channels should be removed from the baseband so that they are not coupled to transmitter 5 and, hence, to terminal 2. To accomplish this end, means 18 includes a band reject filter 22 having a rejection band substantially identical with the passband of filter 20 to remove the channel or group of channels dropped at terminal 3. Hence, by removing the dropped channel or channels, the baseband coupled to modulator-oscillator 11 for modulation thereof includes a given frequency band, corresponding to one or more signal channels which has been eradicated. With this eradicated frequency band, it is possible to insert in the vacant channel signals originating at terminal 3, or received at terminal 3 from a branch terminal, for coupling to terminal 2. Hence, a signal source 23 applies its output to a mixer 24 with the output signals of source 23 having a subcarrier signal appropriate for the channel or channels dropped at terminal 3. It should also be apparent that signals inserted at terminal 3 may be disposed in any vacant channel in the baseband and not only in those channels having the signal dropped at terminal 3. The output signal of mixer 24 including the output signal of band reject filter 22 and the output signal of source 23 is coupled to modulator-oscillator 11 for modulation thereof. The output signal of modulator-oscillator 11 is coupled to mixer 12 for transmission to terminal 2 and to phase comparator 17 to produce the difference or phase lock signal.

It should be appreciated that the inserted signal or signals and the signals which originally occupied the eradicated frequency band would produce a rather odd and probably unintelligible difference signal for application to filter 22. However, due to the action of filter 22 this unintelligible signal will not operate upon modulator-oscillator 11 and, hence, modulator-oscillator 11 is never aware of this unintelligible signal that might be applied to the input of filter 22.

To aid in the understanding of the operation of repeater 3 of FIG. 1, let us retrace slightly the step-by-step operation in the means 16. Modulator-oscillator 11 has its center frequency substantially equal to the center frequency of the intermediate frequency signal at the output of amplifier 10. Remembering that we are dealing with frequency modulated signals it will be appreciated that up until the time that a signal is applied to the input of modulator-oscillator 11 from comparator 17, the output signal of modulator-oscillator 11 will be the center frequency. When this signal is compared to the signal from amplifier 10 we will obtain a difference signal of zero if the frequency is the center frequency and a difference signal equal to the baseband modulation if the output signal of amplifier 10 is shifted in frequency due to baseband modulation of the intermediate frequency signal. The difference signal at the output of comparator 17 is applied through means 18 to frequency modulate the center frequency of modulator-oscillator 11. This frequency modulated output signal of modulator-oscillator 11 is compared with the output signal of amplifier 10 at another instant of time. This may result in a different difference signal to modulate modulator-oscillator 11 particularly if the frequency of the signal at the output of amplifier 10 has been shifted. This comparison process is continued on an instantaneous basis thereby causing the output signal of modulator-oscillator 11 to follow the frequency variation, or baseband modulation of the output signal of amplifier 10.

Since the output signal of modulator-oscillator 11 follows the intermediate frequency signal at the output of amplifier 10, there actually is no demodulation of the signal at the output of amplifier 10 prior to being coupled to the transmitter for remodulation thereby eliminating the distortion heretofore present due to the nonlinearity of the demodulator and modulator. Thus, there results a drop-and-insert repeater terminal which eliminates the previously experienced accumulation of distortion in repeater terminal operation.

It will be observed that at the output of comparator 17 there is disposed a low pass filter 25 which may be placed in means 18 by appropriate positioning of switches 26 and 27. The low pass filter 25 passes only the baseband and thereby substantially eliminates the out-of-band noise which will enhance the signal-to-noise ratio and, hence, prevents the retransmission of out-of-band noise and the accumulation of noise in subsequent repeater terminal operations.

To summarize, a portion of the transmitter signal at the intermediate frequency level is sampled and fed back to a phase comparator where it is compared with an intermediate frequency sample derived from the preceding receiver. The error signal which represents the frequency discrepancy and the distortion of the transmitter frequency modulated signal relative to the receiver frequency modulated signal is fed back to the transmitter input modulation to correct the distortion and to modulate the transmitter in accordance with the baseband signal. With this arrangement the system functions essentially as a directly coupled intermediate frequency repeater since the output intermediate frequency carrier is corrected in frequency, deviation and distortion to agree with the receiver input intermediate frequency carrier.

Referring now to FIG. 2, an alternative arrangement for the components between lines A—A and B—B of FIG. 1 is illustrated. Reference characters of components in FIG. 1 that are also in FIG. 2 will be employed in the description of FIG. 2. As in the system of FIG. 1, the output signal from amplifier 10 is coupled to phase comparator 17 operating to compare the output of modulator-oscillator 11 with the output signal of amplifier 10. The difference signal coupled by means 18 to the input of modulator-oscillator 11 corrects the signal to be transmitted to terminal 2 in frequency, deviation and distortion to agree substantially with the receiver signal at the output of amplifier 10. As in the case of the system of FIG. 1, means 18 includes band reject filter 22 to remove the signal of a channel or a group of channels that are dropped at terminal 3 where communication is wanted only with terminal 3, or branch terminals coupled thereto, and mixer 24 operating to insert the signals of source 23 into a vacant channel in the baseband present at the output of filter 22. As in the case of means 18 of FIG. 1, a low pass filter 25 can be incorporated therein to prevent the retransmission of out-of-band noise but as is illustrated in FIG. 1, this low pass filter can be eliminated. The primary difference between the arrangement of FIG. 1 and FIG. 2 is the manner in which the signal of a channel or group of channels is dropped. Since the output of comparator 17 includes the baseband, the channels to be dropped are selected by filter 20 coupled to the output of comparator 17 and prior to the input of filter 22. The signal of the channel or channels coupled through filter 20 are applied to utilization device 21 which as pointed out hereinabove may be a local speaker, recorder or other responding device, or a transmitter for transmission to an associated branch terminal. In this arrangement for dropping the signals of a selected channel or channels, demodulator 19 of the system of FIG. 1 has been eliminated and instead the output of phase comparator 17 is employed to derive the signal of the desired channel or channels, thereby resulting in saving of equipment.

Turning now to the system of FIG. 3 which may be substituted for the equipment of FIG. 1 between lines A—A and B—B. In this arrangement there is provided several circuit connections which provide fail-safe features for terminal 3. In the description of the system of FIG. 3 like reference characters employed in FIG. 1 will be employed in FIG. 3 for components that function the same as they did in FIG. 1. The intermediate frequency signal output of amplifier 10 is coupled to demodulator 19 wherein the baseband is recovered. The output of demodulator 19 is fed through amplifier 26 to mixer 27, a portion of means 18. The output signal of mixer 27 is coupled to the input of modulator-oscillator 11 to modulate the output signal thereof in accordance with the detected baseband. A portion of the output of modulator-oscillator 11 is sampled and fed to phase comparator 17 where it is compared with a sample derived from the output of amplifier 10. The error signal which represents the distortion of the transmitter intermediate frequency modulation signal relative to the receiver intermediate frequency modulation signal is fed back to the transmitter modulator-oscillator 11 through mixer 27 of means 18 to correct the distortion. This correction provides an intermediate frequency carrier for the transmitter corrected in center frequency, deviation and distortion to agree substantially with the receiver intermediate frequency signal. The baseband output distorted by demodulator 19 and the baseband output of phase comparator 17 plus a distortion correcting signal are coupled to mixer 27 for addition or subtraction therein depending upon the phase relation of these two signals to provide a substantially distortionless baseband for coupling to modulator-oscillator 11.

The drop-and-insert facilities are provided by coupling bandpass filter 20 to the output of amplifier 26 to select a signal channel or group of signal channels for coupling to utilization device 21. Band reject filter 22 is present in means 18 to remove from the baseband that frequency band which has been dropped at terminal 3 with mixer 28 being included at the output of filter 22 to accept the signals from source 23 for insertion into the eradicated frequency band, or any other vacant channel, for application to modulator-oscillator 11.

Order wire signals may be dropped in a manner similar to the normal channel signals. The equipment to carry this out is indicated by box 29, an order wire receiver. Likewise an order wire source 30 may be provided and coupled to the input of modulator-oscillator 11. A difference exists, however, between the order wire arrangement and the channel signal arrangement in that due to the party-line operation typical of the order wire no channel elimination filter is utilized to eliminate feed through of the order wire signal in repeater 3. Should order wire be sectionalized, however, then a suitable band stop filter could be inserted to separate a long-distance system into operational blocks.

The amplifiers 31 and 32 are employed to achieve high loop gain for effective distortion reduction. It may, however, not be necessary to employ separate amplifiers 31 and 32 as illustrated since amplifiers already present in the modulator-oscillator 11 may be sufficient to provide the necessary high loop gain. If this is true then the drop-and-insert applique will be completely passive and could be housed in a cabinet occupying 64 cubic inches of space employing existing components.

As indicated in the system of FIG. 1, low pass filter 25 may preferably be included in means 18 to pass only the baseband and substantially eliminate the out-of-band noise to prevent the retransmission of this out-of-band noise. It should be remembered, however, that this filter 25 may be eliminated as illustrated in FIG. 1.

Several advantages result from the multiplex repeater terminal disclosed herein which are as follows: (1) direct intermediate frequency connection within the repeater is simulated; (2) drop-and-insert facilities can drop and insert as many channels as desired, that is, a single signal channel or a sub-group of signal channels may be dropped and inserted; and (3) the equipment of FIG. 3 incorporates several fail-safe features since connection from amplifier 26 to mixer 27 provides baseband signals if the phase lock loop should fail for modulating modulator-oscillator 11 and the phase lock loop will provide the baseband signal if the demodulator 19 should fail. Thus, this fail-safe arrangement does not disable through traffic although the distortion due to the failed terminal may rise. Furthermore, it is possible that with failure of modulator-oscillator 11 that leakage through phase comparator 17 will be sufficient to provide acceptable service through terminal 3.

For operation of the multiplex terminal repeater of this invention, the phase lock loop will operate provided that the total phase difference between $F_1$ and $F_2$ does not exceed $\pi/2$ radians at any one instant. Provided a large number of channels are not dropped and inserted this is not a serious limitation in the described repeater terminal. It should be noted also that the bandwidth of the filter 25 should be approximately twice the highest frequency of the baseband to provide the optimum signal-to-noise ratio in the repeater terminal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A repeater terminal for a communication system transmitting a composite signal including a plurality of frequency segments comprising a receiver for said composite signal, a transmitter for said composite signal, and means coupled to said receiver and said transmitter responsive to said composite signal at said receiver and said composite signal presented to said transmitter to cause said composite signal presented to said transmitter to follow the frequency of said composite signal at said receiver.

2. A repeater terminal for a communication system transmitting a composite signal including a plurality of frequency segments comprising a receiver for said composite signal, a transmitter for said composite signal having a radio frequency portion, means coupled to said receiver and said radio frequency portion responsive to said composite signal at said receiver and said composite signal applied to said radio frequency portion to produce a control signal proportional to the difference between a predetermined characteristic of said composite signal at said receiver and said composite signal applied to said radio frequency portions, and means to couple said control signal to said transmitter to cause said composite signal applied to said radio frequency portion to follow the frequency of said composite signal at said receiver.

3. A repeater terminal for a communication system transmitting a composite signal including a plurality of frequency segments comprising a receiver for said composite signal, a transmitter for said composite signal, means coupled to said receiver and said transmitter responsive to said composite signal at said receiver and said composite signal presented to said transmitter to cause said composite signal presented to said transmitter to follow the frequency of said composite signal at said receiver, and means coupled to said responsive means to extract the signal of at least one of said segments.

4. A repeater terminal for a communication system transmitting a composite signal including a plurality of frequency segments comprising a receiver for said composite signal, a transmitter for said composite signal, means coupled to said receiver and said transmitter responsive to said composite signal at said receiver and said composite signal presented to said transmitter to cause said composite signal presented to said transmitter to follow the frequency of said composite signal at said receiver, means coupled to said responsive means to extract the signal of at least one of said segments, and means coupled to said responsive means to insert a signal into at least one vacant segment of said segments.

5. A repeater terminal for a frequency division multiplex system transmitting a multiplex signal including a plurality of frequency spaced signal channels comprising a receiver for said multiplex signal, a transmitter for said multiplex signal having a radio frequency portion, means coupled to said receiver and said radio frequency portion responsive to said multiplex signal at said receiver and said multiplex signal applied to said radio frequency portion to produce a control signal proportional to the difference between a predetermined characteristic of said multiplex signal at said receiver and said multiplex signal applied to said radio frequency portion, means to couple said control signal to said transmitter to cause said multiplex signal applied to said radio frequency portion to follow the frequency of said multiplex signal at said receiver, and means coupled to said responsive means to extract the signal from at least one of said channels.

6. A repeater terminal for a frequency division multiplex system transmitting a multiplex signal including a plurality of frequency spaced signal channels comprising a receiver for said multiplex signal, a transmitter for said multiplex signal having a radio frequency portion, means coupled to said receiver and said radio frequency portion responsive to said multiplex signal at said receiver and said multiplex signal applied to said radio frequency portion to produce a control signal proportional to the difference between a predetermined characteristic of said multiplex signal at said receiver and said multiplex signal applied to said radio frequency portion, means to couple said control signal to said transmitter to cause said multiplex signal applied to said radio frequency portion to follow the frequency of said multiplex signal at said receiver, means coupled to said responsive means to extract the signal from at least one of said channel signals, and means coupled to said responsive means to insert a signal into at least one vacant channel of said channels.

7. A repeater terminal for a frequency division multiplex system transmitting a multiplex signal including a plurality of frequency spaced signal channels comprising a receiver for said multiplex signal, a transmitter for said multiplex signal, and a phase lock loop coupled to said receiver and said transmitter responsive to said multiplex signal at said receiver and said multiplex signal presented to said transmitter to cause said multiplex signal presented to said transmitter to follow the frequency of said multiplex signal at said receiver.

8. A repeater terminal for a frequency division multiplex system transmitting a multiplex signal including a plurality of frequency spaced signal channels comprising a receiver for said multiplex signal, a transmitter for said multiplex signal including a radio frequency portion, a phase comparator coupled to said receiver and said radio frequency portion, responsive to said multiplex signal at said receiver and said multiplex signal applied to said radio frequency portion to produce a control signal proportional to the phase difference between said multiplex signal at said receiver and said multiplex signal applied to said radio frequency portion, and means to couple said control signal to said transmitter to cause said multiplex signal applied to said radio frequency portion to follow the frequency of said multiplex signal at said receiver.

9. A repeater terminal for a frequency division multiplex system transmitting a multiplex signal including a plurality of frequency spaced signal channels comprising a receiver for said multiplex signal, a transmitter for said multiplex signal, a phase lock loop coupled to said receiver and said transmitter responsive to said multiplex signal at said receiver and said multiplex signal presented to said transmitter to cause said multiplex signal presented to said transmitter to follow the frequency of said multiplex signal at said receiver, and means coupled to said phase lock loop to extract the signal from at least one of said channels.

10. A repeater terminal for a frequency division multiplex system transmitting a multiplex signal including a plurality of frequency spaced signal channels comprising a receiver for said multiplex signal, a transmitter for said multiplex signal, a phase lock loop coupled to said receiver and said transmitter responsive to said multiplex signal at said receiver and said multiplex signal presented to said transmitter to cause said multiplex signal presented to said transmitter to follow the frequency of said multiplex signal at said receiver, means coupled to said phase lock loop to extract the signal from selected ones of said channels, and means coupled to said phase lock loop to insert a signal into given ones of said selected ones of said channels.

11. A repeater terminal for a frequency division multiplex system transmitting a multiplex signal including a plurality of frequency spaced signal channels comprising a receiver for said multiplex signal, a transmitter for said multiplex signal having a radio frequency portion, a phase comparator coupled to said receiver and said radio frequency portion responsive to said multiplex signal at said receiver and said multiplex signal applied to said radio frequency portion to produce a control signal proportional to the phase difference between said multiplex signal at said receiver and said multiplex signal applied to said radio frequency portion, a band reject filter to couple said control signal to said transmitter to cause said multiplex signal applied to said radio frequency portion to follow the frequency of said multiplex signal at said receiver except for the signal of said channels disposed in the rejection band of said filter, and means coupled to said phase comparator to extract the signal from selected ones of said channels disposed in the rejection band of said filter.

12. A repeater terminal for a frequency division multiplex system transmitting a multiplex signal including a plurality of frequency spaced signal channels comprising a receiver for said multiplex signal, a transmitter for said multiplex signal having a radio frequency portion, a phase comparator coupled to said receiver and said radio frequency portion responsive to said multiplex signal at said receiver and said multiplex signal applied to said radio frequency portion to produce a control signal proportional to the phase difference between said multiplex signal at said receiver and said multiplex signal applied to said radio frequency portion, a band rejection filter to couple said control signal to said transmitter to cause said multiplex signal applied to said radio frequency portion to follow the frequency of said multiplex signal at said receiver except for the signal of said channels disposed in the rejection band of said filter, means coupled to said phase comparator to extract the signal from selected ones of said channels disposed in the rejection band of said filter, and means coupled to the output of said filter to insert a signal into given ones of said selected ones of said channels.

13. A repeater terminal for a frequency division multiplex system transmitting a multiplex signal including a plurality of frequency spaced signal channels comprising a receiver for said multiplex signal including an intermediate frequency amplifier, a transmitter for said multiplex signal including a modulator-oscillator, a phase lock loop coupled to said amplifier and including said modulator-oscillator responsive to the multiplex signal at the output of said amplifier and the multiplex signal at the output of said modulator-oscillator to cause said multiplex signal at the output of said modulator-oscillator to follow said multiplex signal at the output of said amplifier.

14. A repeater terminal for a frequency division multiplex system transmitting a multiplex signal including a plurality of frequency spaced signal channels comprising a receiver for said multiplex signal including an intermediate frequency amplifier, a transmitter for said multiplex signal including a modulator-oscillator, a phase comparator coupled to said amplifier and said modulator-oscillator responsive to the multiplex signal at the output of said amplifier and the multiplex signal at the output of said modulator-oscillator to produce a control signal proportional to the phase difference between said multiplex signal at the output of said amplifier and said multiplex signal at the output of said modulator-oscillator, and means to couple said control signal to said modulator-oscillator to cause said multiplex signal at the output of said modulator-oscillator to follow the frequency of said multiplex signal at the output of said amplifier.

15. A repeater terminal for a frequency division multiplex system transmitting a multiplex signal including a plurality of frequency spaced signal channels comprising a receiver for said multiplex signal including an intermediate frequency amplifier, a transmitter for said multiplex signal including a modulator-oscillator, a phase comparator coupled to said amplifier and said modulator-oscillator responsive to the multiplex signal at the output of said amplifier and the multiplex signal at the output of said modulator-oscillator to produce a control signal proportional to the phase difference between said multiplex signal at the output of said amplifier and said multiplex signal at the output of said modulator-oscillator, a band reject filter coupling said control signal to said modulator oscillator to cause said multiplex signal at the output of said modulator-oscillator to follow the frequency of the multiplex signal at the output of said amplifier except for the signals of said channels disposed in the rejection band of said filter, means coupled to the output of said amplifier to extract the signal from selected ones of said channels disposed in the rejection band of said filter, and means coupled to the input of said modulator-oscillator to insert a signal into given ones of said selected ones of said channels.

16. A repeater terminal for a frequency division multiplex system transmitting a multiplex signal including a plurality of frequency spaced signal channels comprising a receiver for said multiplex signal including an intermediate frequency amplifier, a transmitter for said multiplex signal including a modulator-oscillator, a phase comparator coupled to said amplifier and said modulator-oscillator responsive to the multiplex signal at the output of said amplifier and the multiplex signal at the output of said modulator-oscillator to produce a control signal proportional to the phase difference between said multiplex signal at the output of said amplifier and said multiplex signal at the output of said modulator-oscillator, a band reject filter to couple said control signal to said modulator-oscillator to cause said multiplex signal at the output of said modulator-oscillator to follow the frequency of said multiplex signal at the output of said amplifier except for the signals of said channels disposed in the rejection band of said filter, means coupled to the output of said comparator to extract the signal from selected ones of said channels disposed in the rejection band of said filter, and means coupled to the input of said modulator-oscillator to insert a signal into given ones of said selected ones of said channels.

17. A repeater terminal for a frequency division multiplex system transmitting a multiplex signal including a plurality of frequency spaced signal channels comprising a receiver for said multiplex signal including an intermediate frequency amplifier, a transmitter for said multiplex signal including a modulator-oscillator, a phase comparator coupled to said amplifier and said modulator-oscillator responsive to the multiplex signal at the output of said amplifier and the multiplex signal at the output of said modulator-oscillator to produce a control signal proportional to the phase difference between said multiplex signal at the output of said amplifier and said multiplex signal at the output of said modulator-oscillator, means including a band reject filter coupling said control signal to said modulator-oscillator to cause said multiplex signal at the output of said modulator-oscillator to follow the frequency of the multiplex signal at the output of said amplifier except for the signals of said channels disposed in the rejection band of said filter, a demodulator means coupled to the output of said amplifier to recover the signals of said channels at the output of said amplifier, means coupled to said demodulator to extract the signal of selected ones of said channels disposed in the rejection band of said filter, means coupling the output signal of said demodulator to the input of said filter, and means coupled to the input of said modulator-oscillator to insert a signal into certain ones of said selected ones of said channels.

18. A frequency division multiplex system transmitting a multiplex signal including a plurality of frequency spaced signal channels comprising a first terminal for transmitting said multiplex signal, a second terminal for receiving said multiplex signal, a common medium interconnecting said first and second terminals, a branch terminal intermediate said first and second terminals coupled to said common medium, a receiver at said branch terminal for receiving said multiplex signal, a transmitter at said branch terminal for transmitting said multiplex signal, and means at said branch terminal responsive to said multiplex signal at said receiver and said multiplex signal presented to said transmitter to cause said multiplex signal presented to said transmitter to follow the frequency of said multiplex signal at said receiver.

19. A frequency division multiplex system transmitting a multiplex signal including a plurality of frequency spaced signal channels comprising a first terminal for transmitting said multiplex signal, a second terminal for receiving said multiplex signal, a common medium interconnecting said first and second terminals, a branch terminal intermediate said first and second terminals coupled to said common medium, a receiver at said branch terminal for receiving said multiplex signal, a transmitter at said branch terminal for transmitting said multiplex signal having a radio frequency portion, means at said branch terminal responsive to said multiplex signal at said receiver and said multiplex signal applied to said radio frequency portion to produce a control signal proportional to the difference between a predetermined characteristic of said multiplex signal at said receiver and said multiplex signal applied to said radio frequency portion, and means to couple said control signal to said transmitter to cause said multiplex signal applied to said radio frequency portion to follow the frequency of said multiplex signal at said receiver.

20. A frequency division multiplex system transmitting a multiplex signal including a plurality of frequency spaced signal channels comprising a first terminal for transmitting said multiplex signal, a second terminal for receiving said multiplex signal, a common medium interconnecting said first and second terminals, a branch terminal intermediate said first and second terminals coupled to said common medium, a receiver at said branch terminal for receiving said multiplex signal, a transmitter at said branch terminal for transmitting said multiplex signal, means at said branch terminal responsive to said multiplex signal at said receiver and said multiplex signal presented to said transmitter to cause said multiplex signal presented to said transmitter to follow said multiplex signal at said receiver, means at said branch terminal coupled to said responsive means to extract the signal of at least one of said channels and means at said branch terminal coupled to said responsive means to insert a signal into at least one vacant channel of said channels.

References Cited by the Examiner

UNITED STATES PATENTS

| | | | |
|---|---|---|---|
| 1,677,966 | 7/28 | Green | 179—15 |
| 2,514,425 | 7/50 | Thompson | 179—15 |
| 2,689,882 | 9/54 | Bergan | 179—15.5 |
| 2,802,056 | 8/57 | Affrunti | 179—15 |
| 2,897,274 | 7/59 | Forbes | 179—15 |

FOREIGN PATENTS

| | | |
|---|---|---|
| 653,288 | 5/51 | Great Britain. |

DAVID G. REDINBAUGH, *Primary Examiner.*

ROBERT H. ROSE, *Examiner.*